(12) United States Patent
Winchcomb et al.

(10) Patent No.: US 6,176,247 B1
(45) Date of Patent: Jan. 23, 2001

(54) METHOD AND DEVICE FOR VERIFYING THE WORKABILITY OF A SAFETY DEVICE

(75) Inventors: John Winchcomb, Bedfordshire (GB); Karl-Kristian Högström, Helsinki (FI)

(73) Assignee: Neles Field Controls OY, Helsinki (FI)

( * ) Notice: Under 35 U.S.C. 154(b), the term of this patent shall be extended for 0 days.

(21) Appl. No.: 09/172,678

(22) Filed: Oct. 15, 1998

(51) Int. Cl.[7] .................................................. F16K 37/00
(52) U.S. Cl. .......................... 137/14; 137/552; 137/554; 137/557
(58) Field of Search ........................... 137/552, 554, 137/557, 14; 702/184

(56) References Cited

U.S. PATENT DOCUMENTS

| | | |
|---|---|---|
| 3,901,273 * | 8/1975 | Brouwer et al. ............... 137/552 |
| 4,428,223 | 1/1984 | Trevisan . |
| 4,517,154 | 5/1985 | Dennis . |
| 4,557,136 | 12/1985 | Greenhalf . |
| 5,000,040 | 3/1991 | Charbonneau . |
| 5,329,465 * | 7/1994 | Arcella et al. ................ 137/554 |
| 5,425,270 | 6/1995 | McDonald et al. . |
| 5,469,737 * | 11/1995 | Smith et al. ................. 137/552 |

FOREIGN PATENT DOCUMENTS

| | | |
|---|---|---|
| 232964 | 2/1986 | (DE) . |
| 708389 | 4/1996 | (EP) . |
| 152314 | 5/1985 | (NO) . |
| WO 97/48026 | 12/1997 | (WO) . |

* cited by examiner

Primary Examiner—A. Michael Chambers
(74) Attorney, Agent, or Firm—Pillsbury Madison & Sutro LLP

(57) ABSTRACT

The invention relates to the maintenance of safety devices. Valves and similar automatic, mechanical safety devices normally maintaining a fixed position are in danger of getting stuck, and consequently may not be fully operable in an emergency situation. In a system according to the invention, real-time data indicating the operability of, for example, a valve actuator, is provided. When a fault is discovered, it can be localized using online diagnostic tools. A standby state is continuously maintained, as the unit for activating the safety function is independent of the unit for monitoring the operability, and the latter is bypassed in an emergency situation.

6 Claims, 3 Drawing Sheets

METHOD AND DEVICE FOR VERIFYING THE WORKABILITY OF A SAFETY DEVICE

FIELD OF THE INVENTION

The invention relates to the maintenance of safety devices. Particularly, the invention pertains to the verification of the correct performance of actuator-controlled safety devices comprising movable parts, especially so-called emergency shutdown valves and their control devices, in such a manner that neither production continuity nor the standby state of the devices is impaired.

BACKGROUND OF THE INVENTION

In the various industries, particularly in the petrochemical process industry, systems are used wherein process equipment likely to cause hazards upon failure is provided with valves and other mechanical means designed to bring the process quickly into a safe state if predetermined process parameter limits are exceeded. For example, such a system usually includes valves with single-action actuators, the opening or closing of which releases a built-up overpressure, diverts a hazardous process stream into a holding tank, or the like. Hereinafter, such valves are referred to as shutdown valves (being emergency valves having a closing or an opening function). These valves normally maintain one position, like other corresponding mechanical safety devices, and are consequently at risk for getting stuck if situations forcing a shutdown are not, as is hopefully the case, very frequent. The general safety of shutdown valves is not considered satisfactory when prior art equipment and methods are used. The greatest disadvantage in present systems is, that an existing failure for example, a mechanical component getting stuck—is not necessarily observed when the system is in a standby state, and in an emergency situation the system may be impaired or inoperative.

To verify performance, it is common to test e.g. shutdown valves in a manner simulating a real emergency situation. This practice may in fact cause huge risks, as the workability of the shutdown valve system is temporarily blocked, and if the device is not properly activated, the simulated emergency may become an actual emergency.

One method of testing a shutdown valve is to mechanically limit its travel, thus preventing it from having any significant effect on the process, and check the mobility of the valve within certain limits. This procedure requires the use of, for example, a physical key, and activation of the emergency system is prevented during the testing procedure, at least as regards the unit being tested.

The test is carried out at predetermined intervals, for example twice a year, but the test only proves that the devices are workable at the moment of testing. A fault may develop shortly after the test and remain until the next test. This manner of testing is not a reliable way of verifying operability of the system.

Valve diagnostics using present sensor and digital technology is a fast developing field. For example, in Finnish patent application 96 2406 and European patent application 95 306546, methods are disclosed for surveillance of the condition of control valves using sensors in the actuator and control means of the valve and the analysis of signals from said sensors in a microprocessor to analyze the workability of the valve unit as a whole.

As described above, the surveillance of the condition of a valve or other mechanical device which is part of a safety system involves certain requirements.

DISCLOSURE OF THE INVENTION

General description

A method according to the present invention, which provides for the verification of error-free operation of a mechanical safety device, for example a shutdown valve, while the standby state of the safety system is constantly maintained without impairment. In said method, the safety function and the surveillance or diagnostics function are combined in real time, the safety function nevertheless having a higher priority than the diagnostics function. In a method according to the invention, a component fitted directly to the safety device for activating the safety function is controlled by the plant's high-level safety system which is responsible for safety operations, or alternatively by a logic unit integrated into the device according to the invention, a diagnostics unit being adapted to said activating component. The diagnostics unit is allowed to perform diagnostics not disturbing the process functions whenever the process is in a normal state. In an emergency situation, the diagnostics unit is bypassed, whereby for example neither a fault or disturbance in the diagnostics testing nor an ongoing routine test can impair the safety function. The scope and periodicity of the diagnostics can be programmed into the system in order to achieve a desired level of reliability.

According to one embodiment of the present invention, a device is provided enabling the verification of undisturbed operation of a mechanical safety device while the standby state of the safety system is fully maintained.

The field unit of a safety system according to the invention comprises a microprocessor providing for predetermined self-testing and diagnostics procedures. The field unit further includes a control unit providing for the control of an actuator. By means of appropriate communications means said control unit is connected to, on the one hand, the high-level safety system or the logic unit integrated into the field unit, and on the other hand to the supply of energy to the safety device, e.g. a compressed air supply. The high level safety system or the integrated logic unit activates the safety function directly, bypassing the diagnostics function.

In addition to said field unit, another main component of the safety system according to the present invention is a monitoring unit. The communication link from the high level safety system is routed through the monitoring unit. Preferably, the task of the monitoring unit is to monitor the status of the field unit on-line, and provide the means for presenting status information to the user.

DETAILED DESCRIPTION

The invention is described more closely below with reference to the enclosed drawings, wherein FIG. 1 is a schematic representation of a system for implementing the method of the present invention;

Figure 1:
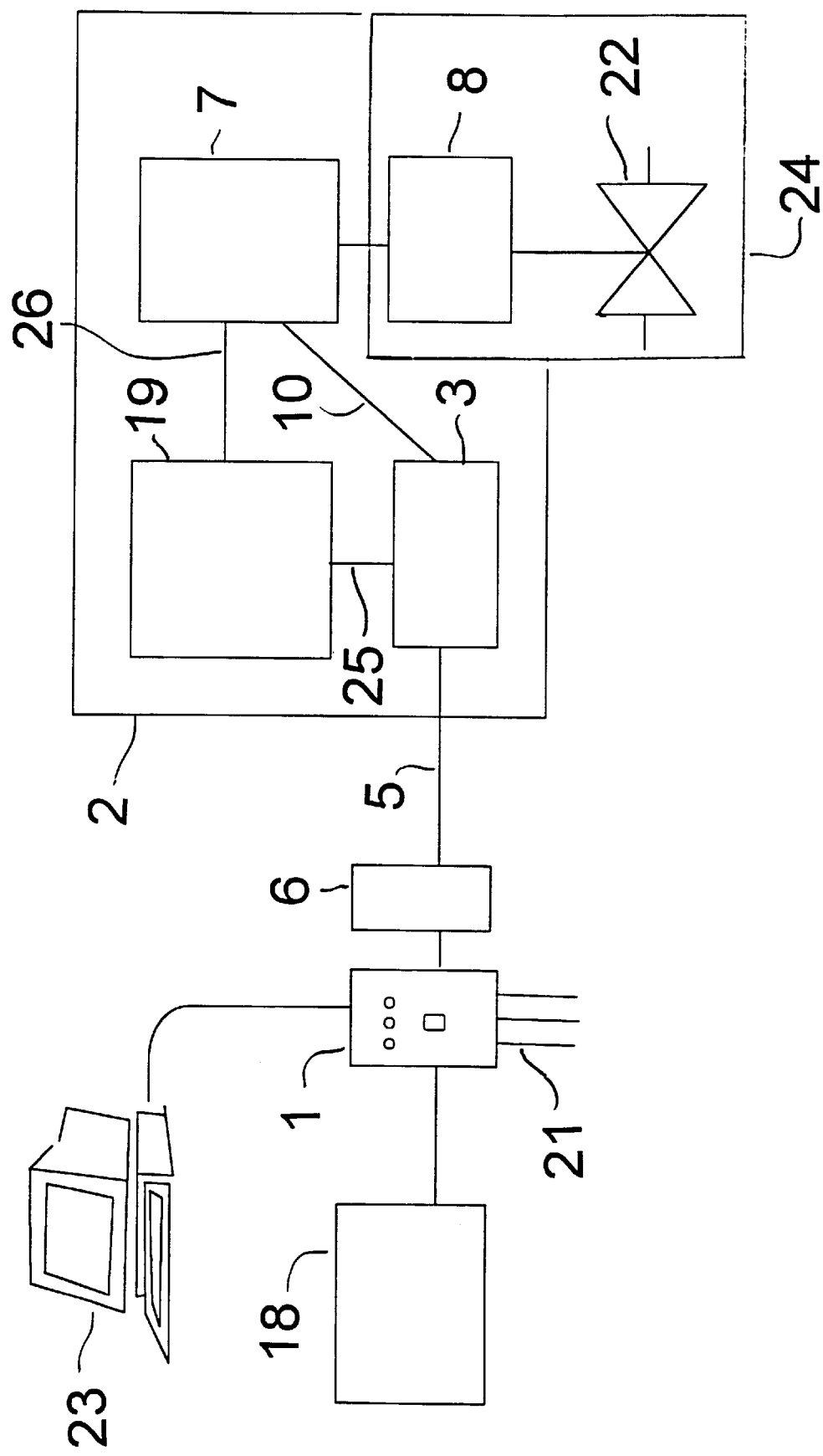

In FIG. 1, (1) represents a monitoring unit of a system according to present invention and (2) is a field unit comprising a control unit (7) according to the invention, a communication interface (3), an electronics unit (19) including a microprocessor, and the required sensors and pneumatic components (not shown). The control unit (7) controls a safety device (24) comprising an actuator (8) and a valve (22). The communication between monitoring unit (1) and control unit (7) is preferably maintained through communication link (5) as described below. Communication link (5) can be analog or digital or a combination of both by means of, for example, a paired cable. As the field area usually is an explosion-risk area, in this case the system includes a barrier unit (6).

Field unit (2) is supplied with power voltage, preferably 24 V, from the high level safety system (18) in charge of safety functions or, in case the safety system according to the present invention includes a logic unit, from a digital communication link. Preferably, the monitoring unit (1) is provided with indicator lights reflecting the state of the field unit, and relay outputs (21) corresponding to said indicator lights. For example, a green light may indicate the signal being normal and the safety system according to the invention being in a standby state. At programmable intervals, the microprocessor included in electronics unit (19) carries out diagnostics. Thereby the signal in link (5) changes, as indicated by, for example, a yellow light. When diagnostics has revealed a fault, this is correspondingly indicated by, for example, a red light. The signals corresponding to the indicator lights can be forwarded through, e.g., relay outputs (21). The performance of the light indicators and the relay outputs may for example be checked by means of a local push button on the monitoring unit. Preferably, the monitoring unit (1) is connected to a computer (23) running a safety system maintenance program, enabling the determination of the character of a fault by analysis of data stored by the diagnostics system. The communication required by this function is preferably also provided by communication link 5.

Further, the monitoring unit housing preferably includes means (for example, a keyboard and a LED display) for local control of the microprocessor included in electronics unit (19). The task of the communication interface (3) is to separate the signals, described below, transmitted by communication link (5). In addition, it may incorporate the logic unit integrated in the field unit.

At the communication interface (3) the communication link splits into a direct link (10) to the control unit (7) and a link (25) to electronics unit (19). Further, the electronics unit (19) is connected (26) to the control unit.

During normal operation, tests on the control unit (7) and the safety device (24) are performed at defined intervals under the control of the program residing in the microprocessor within the electronics unit (19). Tests can also be performed ad hoc by means of computer (23).

In a situation where the emergency function is activated, the signal is carried directly from the high level safety system via links (5) and (10) to control unit (7), for example in a manner described below. Alternatively, a logic unit integrated into communication interface (3) may transmit a signal along link (10) directly to control unit (7).

Figure 2:
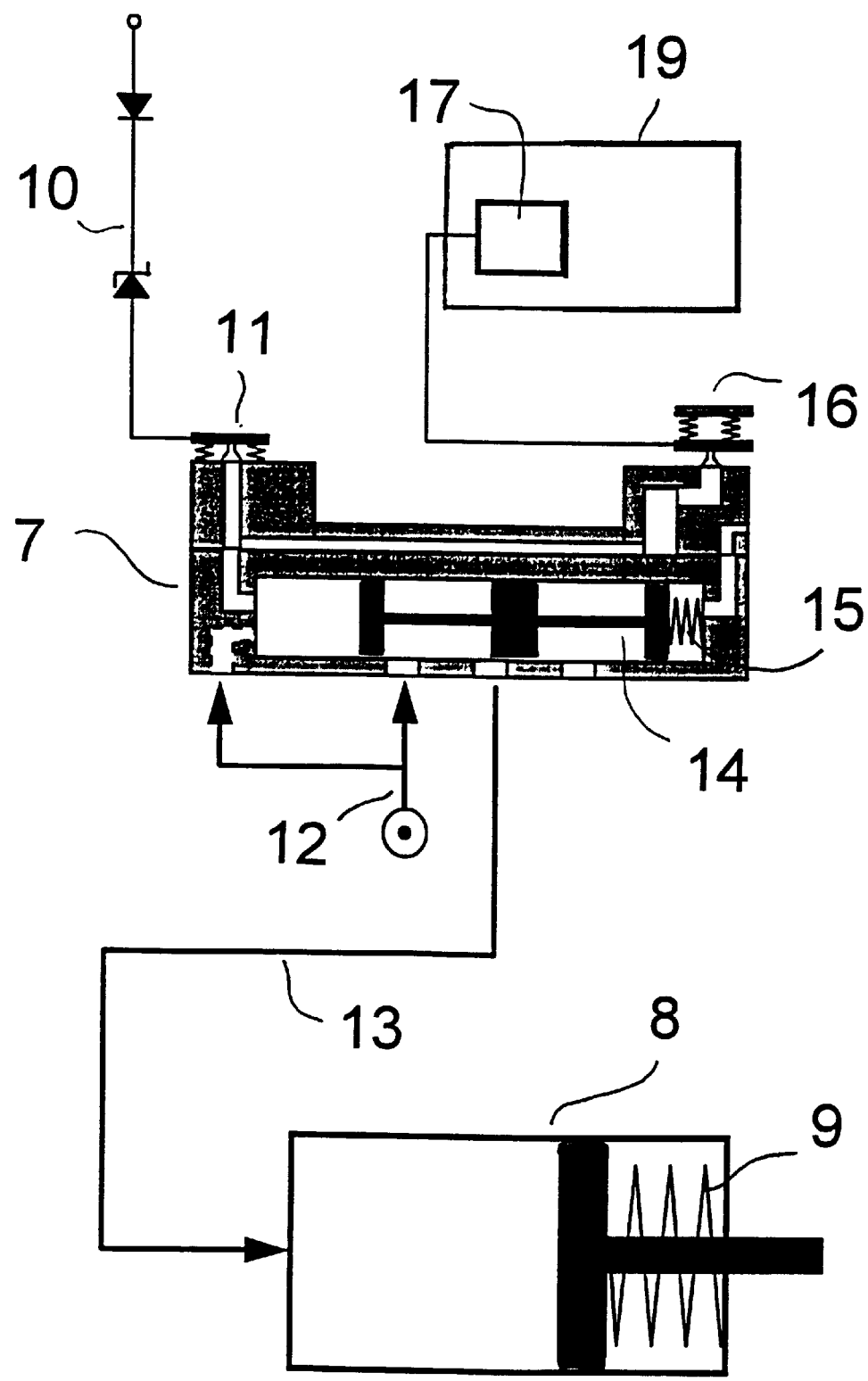
FIG. 2 is a representation of a field unit according to the present invention connected to a valve actuator in a normal situation.

In FIG. 2, reference numeral (7) indicates the main valve of field unit (2). The figure represents a situation of normal operation: As connection (10) is live with 24 V control voltage, pneumatic control valve (11) is closed and slide (14) is pushed to the right against spring (15). Hereby the operating air pressure of the actuator acts freely through connections (12) and (13), and the valve actuator cylinder (8) is pressurized, spring (9) being compressed. Microprocessor (17) within electronics unit (19) is allowed to carry out diagnostics by means of pneumatic control valve (16) as described below.

Figure 3:
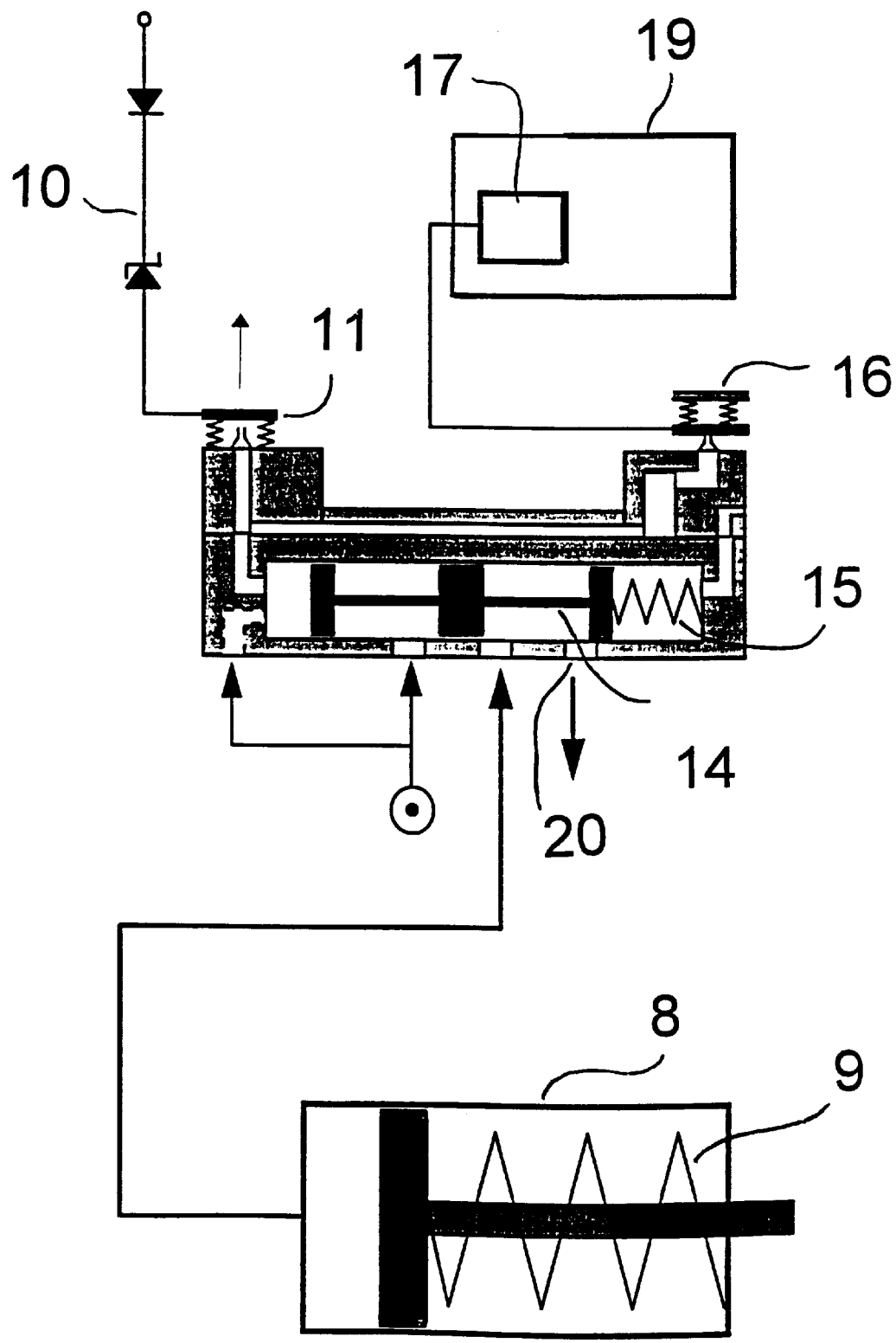
FIG. 3 is a representation of a field unit and actuator according to the present invention in an emergency situation.

FIG. 3 represents a situation where the safety function has been activated. The voltage in connection (10) has fallen to zero, and the pressure is released through valve (11). Spring (15) pushes slide (14) to the left, the actuator pressure is released through aperture (20), and actuator (8), by means of the energy in compressed spring (9), brings the shutdown valve into its safety position, which may be open or closed. The function of microprocessor (17) has no influence on the situation. Preferably, the microprocessor is de-energized in this situation, the it is supplied with power from the same connection as control valve (11). Naturally, the field electronics unit (19) of the shutdown valve is normally provided with nonvolatile memory circuits able to store measurement data relating to the safety function before power disappears.

Microprocessor (17) receives at least the following input data:
position of the control valve
position of the shutdown valve
cylinder pressure of actuator
commands entered from a local keyboard Microprocessor (17) can be programmed to perform diagnostics functions at predetermined intervals, preferably 15 ms–24 h. In the preferable embodiment described below, these comprise a so-called hysteresis test. Before starting the test, the microprocessor transmits, by altering the signal of communication link (5), a message to monitoring unit (1) which shifts to indicate that a test is in progress. Next, the control pressure is lowered by means of valve (16) during a predetermined time interval to a predetermined level and back to the starting level, whereby a corresponding decrease in actuator pressure shall be observed within a defined time delay, as indicated by sensors. As the pressure is decreased and returned to the initial state within a defined time interval, a corresponding predetermined change in shutdown valve position shall be observed within a defined time delay.

If target values are not attained, microprocessor (17) transmits, by altering the signal in communication link (5), a message to monitoring unit (1) which shifts to indicate failure alarm. The movements of the shutdown valve during the test cycle are limited in order not to interfere with the process.

In addition to the test described above to verify the mechanical workability of a shutdown valve, diagnostics include other functions outside the scope of the present invention, e.g. internal diagnostics of electronic components and characterization of valve leakage and valve movement using a separate acoustic sensor.

According to an embodiment of the present application, all communication between field and control room can take place along the same communication link (5). Preferably, this is a paired cable for a) maintaining the control voltage, e.g. 24 V, of the high level safety system (18), simultaneously maintaining the standby state of field unit (2);
b) controlling the indicator lights and relay outputs of monitoring unit (1) by means of signal changes
c) communication between the safety system maintenance program in computer (23) and electronics unit (19) using, for example, the HART protocol well known to persons skilled in the art.

The above arrangement is preferable because retrofitting of the system into existing plants is convenient.

The invention is described herein using a system implemented to a valve, but it is obvious that the invention may, without deviating from its general concept, be implemented in other safety devices comprising mechanical parts, not necessarily controlling fluid flows but providing a safe state by other means.

What is claimed is:
1. A method for verifying the workability of a safety device and the safety system controlling it, comprising:

providing a verifying system, constructed and arranged to verify the mobility of movable parts and the workability of electrical units of the safety system;

providing a safety function activator, constructed and arranged to activate the safety function;

wherein activation of the safety function overrides the verifying system.

2. A met hod according to claim 1, wherein a procedure for verifying mobility of moving parts and workability of electrical components in the safety system is performed according to one of: continuously according to a predetermined schedule and as single events in response to an instruction provided by means of a communication link.

3. A device for the verification of the workability of a safety device comprising:

at least one movable part;

a verifying system constructed and arranged to verify workability of the movable part:

a safety function activator, constructed and arranged to activate a safety function, the activator being independent of the verifying system, such that the safety function activator may be activated during verification of the workability of the moving.

4. A device according to claim 3, wherein the safety function activator further comprises:

a field unit adapted to the safety device and a monitoring unit situated remote from the field unit; and a communication link between said units, whereby signals from the verifying system and signals from the safety function activator are transmitted in said communication link.

5. A device according to claim 3 or 4, wherein the safety device further comprises an actuator and a valve.

6. A device for verification of the workability of a safety valve having a range of motion, comprising:

at least one sensor, constructed and arranged to monitor the safety valve;

an actuator, constructed and arranged to actuate the safety valve;

a control unit for controlling the actuator and the safety valve; and a high level safety system, wherein the control unit verifies the workability of the safety valve by controlling the actuator to cause the valve to be moved at least partially through its range of motion and the high level safety system is constructed and arranged to actuate the safety valve into a safe position even when the control unit is controlling the actuator to verify the workability of the safety valve.

* * * * *

UNITED STATES PATENT AND TRADEMARK OFFICE
CERTIFICATE OF CORRECTION

PATENT NO.     : 6,176,247 B1  
DATED          : January 23, 2001  
INVENTOR(S)    : Winchcomb et al.

It is certified that error appears in the above-identified patent and that said Letters Patent is hereby corrected as shown below:

<u>Title page,</u>
Item [30], should be added as follows:

-- [30]     Foreign Application Priority Data
            October 17, 1997   Finland        973990 --.

Signed and Sealed this

Fifteenth Day of November, 2005

JON W. DUDAS
*Director of the United States Patent and Trademark Office*